(12) United States Patent
Girgensohn et al.

(10) Patent No.: US 7,483,619 B2
(45) Date of Patent: Jan. 27, 2009

(54) SYSTEM FOR AUTHORING AND VIEWING DETAIL ON DEMAND VIDEO

(75) Inventors: Andreas Girgensohn, Menlo Park, CA (US); Frank M. Shipman, III, College Station, TX (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1031 days.

(21) Appl. No.: 10/116,026

(22) Filed: Apr. 3, 2002

(65) Prior Publication Data
US 2003/0190143 A1    Oct. 9, 2003

(51) Int. Cl.
*H04N 5/93* (2006.01)
(52) U.S. Cl. .................... 386/55; 386/95; 386/125; 382/165; 382/170
(58) Field of Classification Search ............... 382/165, 382/170; 386/95, 125, 55
See application file for complete search history.

(56) References Cited

U.S. PATENT DOCUMENTS

| | | | |
|---|---|---|---|
| 6,895,170 B1 * | 5/2005 | Lambert et al. ............... | 386/95 |
| 2001/0021268 A1 * | 9/2001 | Jun et al. .................... | 382/165 |
| 2002/0126143 A1 * | 9/2002 | Bae et al. .................... | 345/723 |
| 2003/0189588 A1 | 10/2003 | Girgensohn | |
| 2003/0190143 A1 | 10/2003 | Girgensohn | |

OTHER PUBLICATIONS

U.S. Appl. No. 09/618,649, filed Jul. 18, 2000, Andreas Girgensohn.
U.S. Appl. No. 09/618,533, filed Jul. 18, 2000, Andreas Girgensohn.
Avrahami, G., Brooks, K.P., and Brown, M.H., "A Two-View Approach to Constructing User Interfaces," *ACM SIGGRAPH '89*, Boston, Jul. 31-Aug. 4, 1989.
Boreczky, J. and Wilcox, L., "A Hidden Markov Model Framework for Video Segmentation Using Audio and Image Features," in *Proc ICASSP '98*, IEEE, May 1998, Seattle.
Boreczky, J. and Rowe, L., "Comparison of Video Shot Boundary Detection Techniques," *Proc. SPIE Storage and Retrieval for Image and Video Databases IV*, San Jose, CA, 1996.
Christel, M., Smith, M., Taylor, C., and Winkler, D., "Evolving Video Skims into Useful Multimedia Abstractions," in *Human Factors in Computing Systems, ACM CHI '98 Conference Proceedings*, pp. 171-178, Los Angeles, Apr. 1998.

(Continued)

*Primary Examiner*—Marsha D Banks Harold
*Assistant Examiner*—Daniel Tekle
(74) *Attorney, Agent, or Firm*—Fliesler Meyer LLP

(57) ABSTRACT

A method and system provide additional detail to a video sequence in response to user input. The system allows a user to generate a link from an anchor point in a source video sequence to a target point in a destination video sequence. A video sequence may be constructed from a single video clip or a video composite comprised of video clips and other video composites. Video composites may be used as objects to create video sequences. Links between video source and destination points may span one or more levels in a hierarchical video structure. A user may configure the anchor point and target point to be at different locations within corresponding video sequences.

3 Claims, 8 Drawing Sheets

OTHER PUBLICATIONS

Girgensohn, A. and Boreczky, J. "Time-Constrained Keyframe Selection Technique," in *IEEE Multimedia Systems '99, IEEE Computer Society*, vol. 1, pp. 756-761, 1999.

He, L., Sanocki, E., Gupta, A., and Grudin, J., "Auto-Summarization of Audio-Video Presentations," *ACM Multimedia*, Apr. 1999.

Knuth, D., *The T<sub>E</sub>Xbook*, Addison-Wesley, 1984.

Pfeiffer, S., Lienhart, R., Fischer, S. and Effelsberg, W., "Abstracting Digital Movies Automatically," in *Journal of Visual Communication and Image Representation*, vol. 7, No. 4, pp. 345-353, Dec. 1996.

Smith, M. and Kanade, T., "Video Skimming and Characterization through the Combination of Image and Language Understanding Techniques," in *Proc. Computer Vision and Pattern Recognition*, pp. 775-781, 1997.

Uchihashi, S. and Foote, J., "Summarizing Video Using a Shot Importance Measure and a Frame-Packing Algorithm," in *Proc. ICASSP '99*, vol. 6, pp. 3041-3044, 1999.

Webster, B.F. *The NeXT Book*, Addison-Wesley, 1989.

Gross, G., "Molecular Mechanics Optimisation," http://www.chem.swin.edu.au/modules/mod6/molmech_1.html, Oct. 9, 2000.

Girgensohn, A., Boreczky, J., Chiu, P., Doherty, J., Foote, J., Golovchinsky, G., Uchihashi, S., and Wilcox, L., "A Semi-Automatic Approach to Home Video Editing," *Proceedings of UIST '00*, pp. 81-89, 2000.

Lienhart, R., "Dynamic Video Summarization of Home Video," *SPIE 3972: Storage and Retrieval for Media Databases 2000*, pp. 378-389, 2000.

Smith, J.M., Stotts, D. and Kum, S.-U., "An Orthogonal Taxonomy For Hyperlink Anchor Generation in Video Streams Using OvalTine," *Proc. Of ACM Hypertext 2000*, pp. 11-18, 2000.

Sundaram, H. and Chang, S.-F., "Condensing Computable Scenes Using Visual Complexity and Film Syntax Analysis," *Proceedings of ICME 2001*, pp. 389-392, 2001.

Uchihashi, S., Foote, J., Girgensohn, A. and Boreczky, J., "Video Manga: Generating Semantically Meaningful Video Summaries," *Proceedings of ACM Multimedia '99*, pp. 383-392.

Boissiére, G., "Automatic creation of hypervideo news libraries for the World WIde Web," *Hypertext '98 Proceedings, ACM*, Pittsburgh, PA, 1998.

Yeung, M.M., and Yeo, B.-L., "Video Visualization for Compact Presentation and Fast Browsing of Pictorial Content," *IEEE Transactions on Circuits and Systems for Video Technology*, vol. 7, No. 5, Oct. 1997.

Zhang, H.J., et al., "Automatic Parsing and Indexing of News Video," *Multimedia Systems*, 2 (6), pp. 256-266, 1995.

Russell, D., "A Design Pattern-based Video Summarization Technique: Moving from Low-level Signals to High-level Structure," *IEEE 33<sup>rd</sup> Hawaii International Conference on System Sciences*, vol. 3, Maui, Hawaii, Jan. 4-7, 2000.

\* cited by examiner

740

720

SYSTEM FOR AUTHORING AND VIEWING DETAIL ON DEMAND VIDEO

CROSS-REFERENCE TO RELATED APPLICATION

This Application is related to the following application Ser. No. 10/116,012, which is filed of even date herewith, and is incorporated herein by reference:
"Reduced Representations of Video Sequences".

FIELD OF THE INVENTION

The invention relates to generating digital video sequences, and more particularly to generating digital video sequences having multiple levels of detail and responsive to user input.

BACKGROUND

With the advent of many different digital video systems, many types of interactive video have been developed. One type of interactive video is the inclusion of optional side trips. This type of interactive video allows users to follow a link out of the currently playing video to watch an alternate video sequence. At the end of the video sequence, or upon user input, the video presentation returns to the original video departure point and continues to play.

Expanding on the concept of optional side trips in video, detail on demand video comprises one or more base video sequences. Each base video sequence has one or more optional alternate video sequences. Each alternate video sequence provides additional details related to the base video sequence. During video playback, users may select the alternate video sequence to view this additional detail.

Upon user input or completion of the alternate video sequence, the presentation returns to the base video sequence. The location where the presentation resumes may be determined by the author. Additionally, alternate video sequences may have links to other video sequences, creating a hierarchical structure in which video sequences providing additional detail may in turn contain links for even more detail.

The nature of detail on demand video is well suited for creating training or "how-to" videos. In this application, viewers are able to get the level of explanation they need. The base video sequences may present an overview of the information at an abstract level. Users may follow a link from a base video sequence to view a more detailed presentation of the information in an alternate video sequence. Even further detail may be optionally provided by linking the alternate video sequence to another video sequence. This hierarchical presentation allows the viewer to watch detailed presentations of the topics in which they need the most help, while skipping over familiar portions of the presentation. This allows video guides to serve a wide audience by presenting a customized level of detail for each viewer. This also saves the viewer time by avoiding detailed presentations of information already familiar to the user.

Home video editing is another application for detail on demand video. Home users may create video summaries of family activities. More detailed presentations of different activities may be linked to the base video sequence to provide additional footage of interest. For example, a family video Christmas card may contain a main video sequence summarizing family activities for the year. Viewers may select a link during each portion of the main video sequence to view additional video from the family activity of interest. For examples, a grandparent may select additional video sequences of grandchildren, while other relatives may select addition details of a party or a family reunion.

It is desirable to offer a simple, yet flexible interface for creating detail on demand video. This interface should allow users to create detail on demand video without having to deal with the complexities associated with freeform hypervideo or nonlinear video editing. The interface should also support a hierarchical video structure. In order to facilitate rapid development, the interface should allow grouping of video clips into a video composite. The video composites may be used as building blocks to create video sequences or optional alternate video sequences. It is also desirable to specify the entry and exit points between a base video sequence and an alternate video sequence. This allows the alternate video sequence to function as a substitution for the base video sequence, rather than a side trip.

Given the limited real estate of the screen, it is desirable to have reduced representations of video composites. In order to be effective, the reduced representation should display important characteristics of its video sequence. These include the starting and ending clip since those are important to the author who must generate transitions between this sequence and other video being edited. Other useful information includes the other clips in the sequence, the time length of the sequence, the number of component clips, and the depth of the composite (for when the composite contains other composites.) It is further desirable to automatically select the most interesting area of a keyframe for incorporation in a video composite, or to visualize object motion over time.

SUMMARY

In one embodiment of the present invention, a method and system for providing additional detail to a video sequence in response to user input is provided. The system allows a user to generate a video sequence having additional detail by generating a link from an anchor point in a source video sequence to a target point in a destination video sequence. A video sequence may be constructed from a single video clip or a video composite comprised of video clips and other composites. Video composites may be used as objects to create video sequences. Links between video source and destination points may span one or more levels in a hierarchical video structure. A user may configure the anchor point and target point to be at different locations within corresponding video sequences.

DESCRIPTION OF THE FIGURES

The present invention will be described with reference to the drawings, in which.

DETAILED DESCRIPTION

Figure 1:
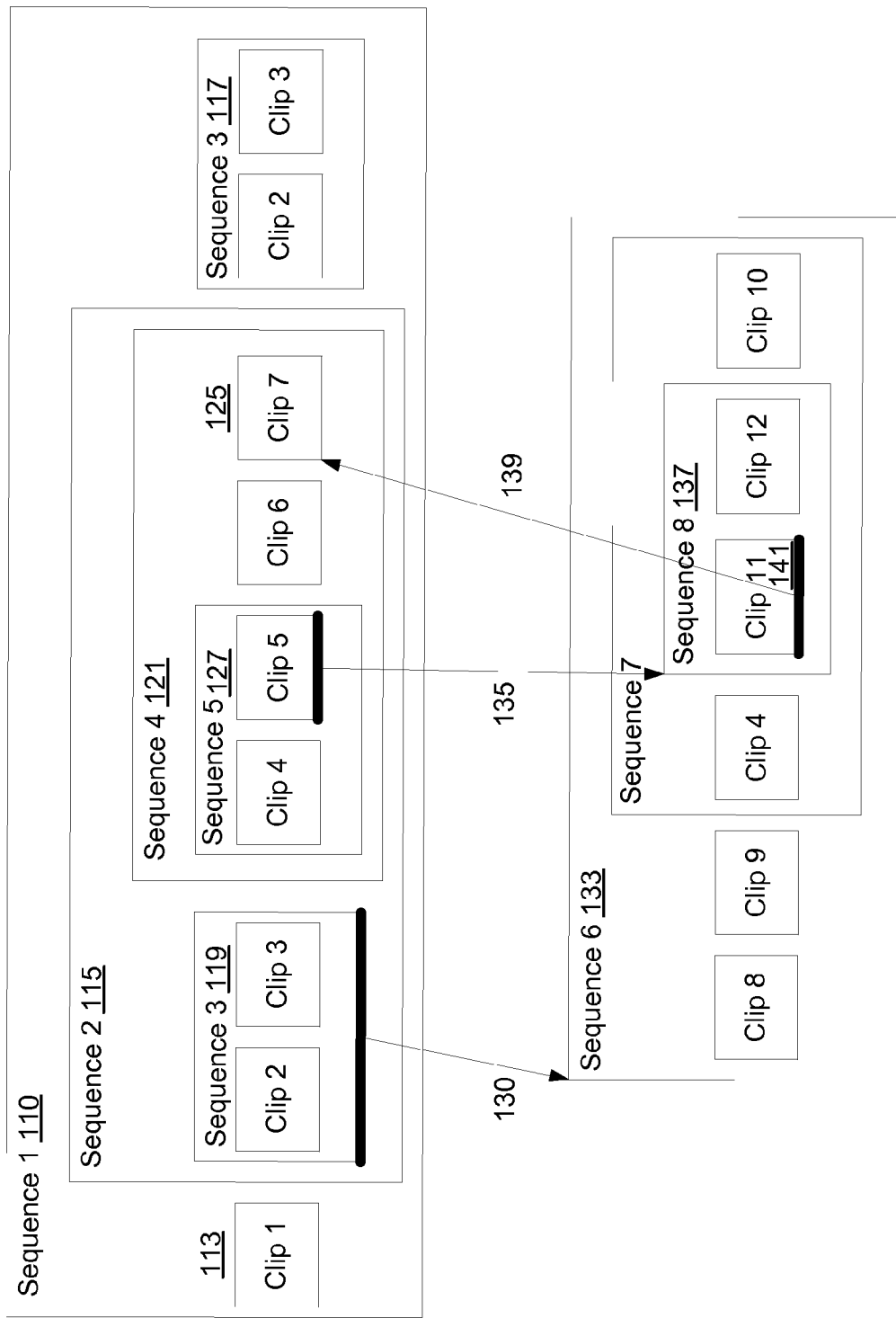
FIG. 1 illustrates a hierarchy of video clips and video composites arranged on a layout space.

A simple, flexible interface for creating detail on demand video allows users to create detail on demand video without having to deal with the complexities associated with freeform hypervideo or nonlinear video editing. In an embodiment, the interface is comprised of a two dimensional layout space for arranging video clips. Each video clip is represented by an icon, a still picture, or a reduced representation. The order of the video clips in the layout space determines the final chronological order of the video sequence.

The interface presented is adaptable for use on any general purpose computer or other information processing device. This includes desktop and portable computers, personal digital assistants, embedded computing systems, information appliances, cell phones, and any other device capable of processing digital information. The computer may optionally include user input devices, such as keyboards or pointing devices, and output devices, such as graphic displays devices and video recording devices.

The interface supports the rapid development of a hierarchical video structure. Unlike other video editing applications, an embodiment of the invention allows the grouping of several video clips into a video composite. Although the video composite is a sequence of video clips, the user may manipulate the video composite as a single, unified object. Video composites may be manipulated in the same manner as single video clips. In this manner, video composites are used as building blocks to create video sequences or optional alternate video sequences. During playback, the component video clips of a video composite are played in the order in which they are grouped in the video composite.

Links may be created between video clips, between video composites, or between video clips and video composites. Links specify a transition between a source, or anchor, video sequence and a destination, or target video sequence. During playback, the link transition is performed in response to user input. In an embodiment, the link is traversed from source to destination in response to a first user input. An alternate user input causes the traversal of a link from destination to source. Alternatively, a link is traversed from destination to source at the completion of a video sequence. In an embodiment, link attributes specify the entry and exit points between a base video sequence and an alternate video sequence. This allows the alternate video sequence to function as a substitution for the base video sequence, rather than a side trip.

Video may be input into the editing application as a video data file. One standard format for digital video is the DV video format. Other digital video formats may be easily adapted to the present invention. In an alternate embodiment, an analog video signal may be input into the editing application via hardware and/or software for converting the analog video signal into a digital video signal and storing the digital video data. In either embodiment, the digital video file may be stored on a local digital information storage medium, or alternatively, stored on a remote digital information storage medium accessible via a local or wide area computer network.

The video is segmented in short video clips. Video clips typically represent a single scene of video. In an embodiment, if segmentation is performed prior to input into the application, then each video clip is contained in a separate digital video file. In an alternate embodiment, a single video file containing multiple video clips is input into the application. Segmentation is performed by the application in several different methods.

In a first embodiment, segmentation is performed by detecting the location where the camera has been turned off or on. For the DV video format, this information is explicitly stored in the DV video file.

Another method of segmentation is by detecting fast camera motion. Frames of the video source are compared with each other to compute a motion vector. The video is segmented into separate video clips at locations where the magnitude of the motion vector exceeds a threshold value.

Alternatively, color similarities may be used to segment the video source. Adjacent frames are compared for color similarity. The video is segmented into separate video clips at locations where the magnitude of the color dissimilarity exceeds a threshold value.

The output video is created by selecting, modifying, and reordering video clips. To facilitate rapid manipulation of video clips, users create video composites by grouping of several video clips together. The sequence of clips in a video composite determines the sequence of clips during playback. During editing, the user may manipulate the video composite as a single, unified object in the same manner as single video clips. Like video clips, they may be moved, cut, copied, and pasted or inserted into a video sequence. Moreover, video composites may also contain other video composites. Video composites allow users to create video sequences or optional alternate video sequences with reusable building blocks.

In an embodiment, video composites may be created using a graphical interface. Each video clip in the composite is selected by the user in the desired chronological order. A group command is executed in order to create the composite. The separate representations for each video clip may be replaced by a single representation. This may be an icon, one or more still images, or a reduced representation.

FIG. 1 shows a hierarchy of video clips and video composites arranged on a layout space. Video composite 110, labeled Sequence 1, is comprised of video clip 113 and video composites 115 and 117, labeled Sequence 2 and Sequence 3 respectively. Each video composite can be manipulated in the same manner as a single video clip, allowing for the rapid development of complex video sequences. For example, video composite 115 is comprised of an alternate copy of Sequence 3, 119 and Sequence 4, 121. It should be noted that video composites 117 and 119 are identical copies of the same sequence, Sequence 3. The use of multiple copies of the same sequence allows the user to reuse the same content in multiple contexts.

Links may be created between video clips and video composites to specify alternate video sequences for detail on demand video. Link 130 specifies that Sequence 6, 133, is an alternate video sequence for Sequence 3, 119. Similarly, link 135 specifies that Sequence 8, 137 is an alternate video sequence for video clip 127, and link 139 specifies that video clip 125 is an alternate video sequence for video clip 141.

As can be seen from FIG. 1, links may be created from video clips and video composites. Since any links may be placed between any two video clips or composites, a user may create circular references. In an embodiment, the application detects circular references and notifies the user. Additionally, users may create multiple layers of detail on demand video, as opposed to the simple two layer example shown in FIG. 1. In an embodiment, information on transitions between video sequences is maintained in a data stack, a commonly used last in, first out (LIFO) data structure.

Figure 2:
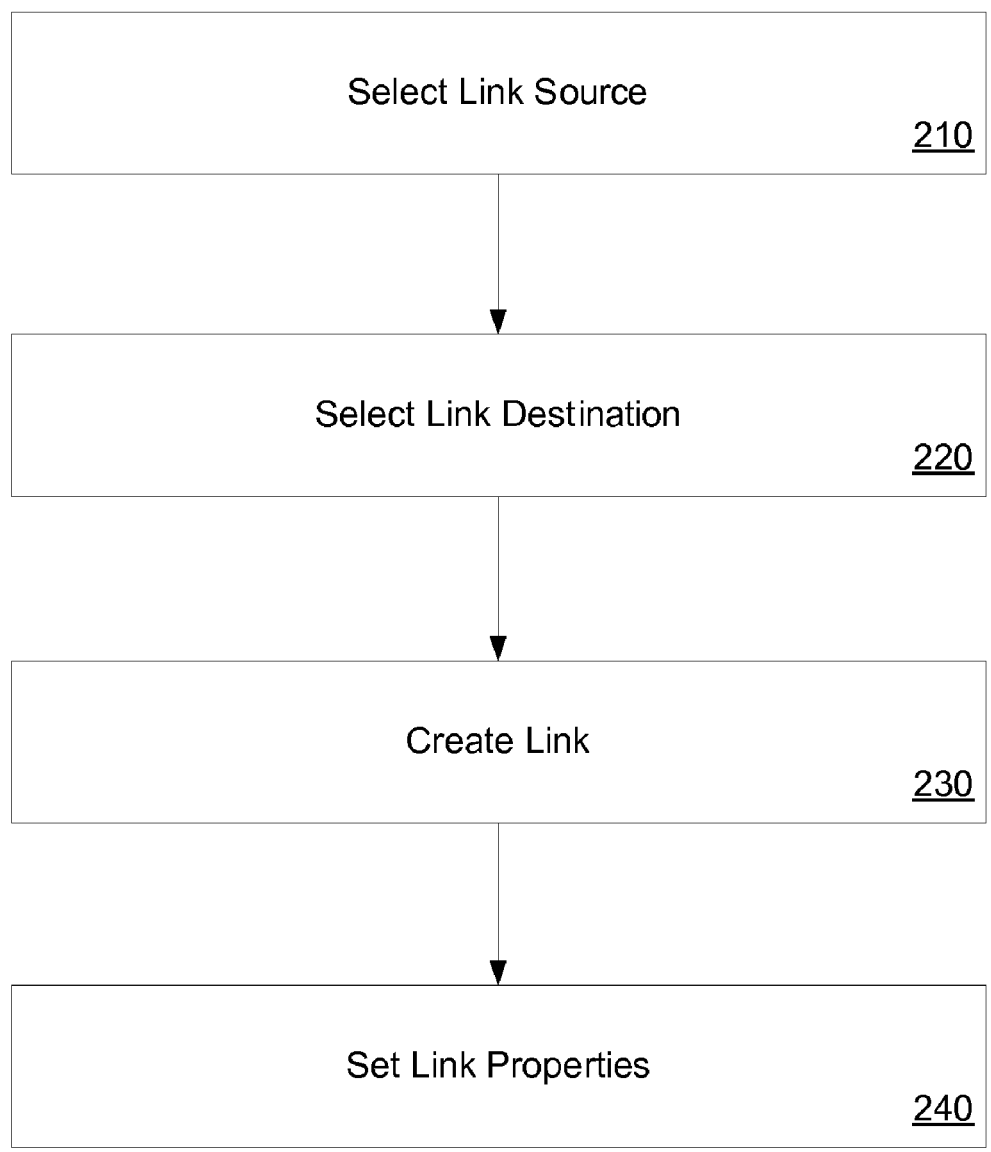
FIG. 2 illustrates a method for creating links between video sequences for detail on demand video according to an embodiment of the present invention.

FIG. 2 is a flowchart showing a method for creating a link for detail on demand video. At step 210, a link source is selected. Similarly, a link destination is selected at step 220. The link source and destination may be a video clip or video composite. A link is created at step 230 through a user command. Finally, link attributes may be setup by the user at step 240. Link attributes specify the entry and exit points between the source video sequence and the destination video sequence and are discussed in detail below. Depending on the user interface, steps 210 through 240 may be completed in any order.

Link attributes control the presentation of detail on demand video by specifying the type of transition between source and destination video sequences. Link attributes include the sequence start point when entering a destination video sequence, the playback resumption point of the source video sequence when the destination playback is complete, and the playback resumption of the source video sequence when the destination playback is interrupted by the user. Link attributes may be set by the user, or be automatically set to a default point by the application.

In an embodiment, when a destination video sequence is complete or interrupted by the user, the playback returns to the source video sequence. Alternatively, playback could be redirected to a different video sequence. Link attributes upon termination of the destination video sequence playback, either through user input or the end of the sequence, may be, in an embodiment, at the point of departure from the source video. Alternatively, the playback may return to the end of the source video sequence. In a further embodiment, playback may return at a predetermined point of the source video sequence. Another embodiment returns to the source video sequence at a location proportional to the point of termination of the destination video. For example, if the user exits the destination sequence halfway through the sequence, then playback of the source video sequence will begin approximately halfway through the source video sequence.

In an embodiment, the destination video sequence start point is the beginning of the destination video sequence. In an alternate embodiment, the destination video start point is proportional to the playback position of the source video sequence. For example, if the user selects the link halfway through a source video sequence, then playback of the destination video sequence will begin approximately halfway through the destination video sequence. In a further embodiment, if the source video sequence and destination are comprised of the same number of video clips or composites, then the destination start point corresponds to the currently playing portion of the source video sequence.

The completed video may be exported from the application to a data file containing the video information as well as the link information. In an alternate embodiment, the link information is stored in a separate data file, such as an edit decision list, from the video information. In a further embodiment, the video data and the link information is used to create a DVD disc according to well known methods in the art.

Given the limited real estate of the screen, reduced representations of video composites are used to display important characteristics of a video sequence. These include the starting and ending video clip, a selection of other clips in the sequence, the time length of the sequence, the number of component clips, and the depth of the composite (for when the composite contains other composites.) In the layout space, a reduced representation is a single graphical object. The reduced representation may be expanded by the user. When expanding a composite, the images representing the composites and individual clips of the next level are shown. In an embodiment, the unexpanded reduced representation occupies the same amount of screen space as the representation of a single video clip.

Figure 3:
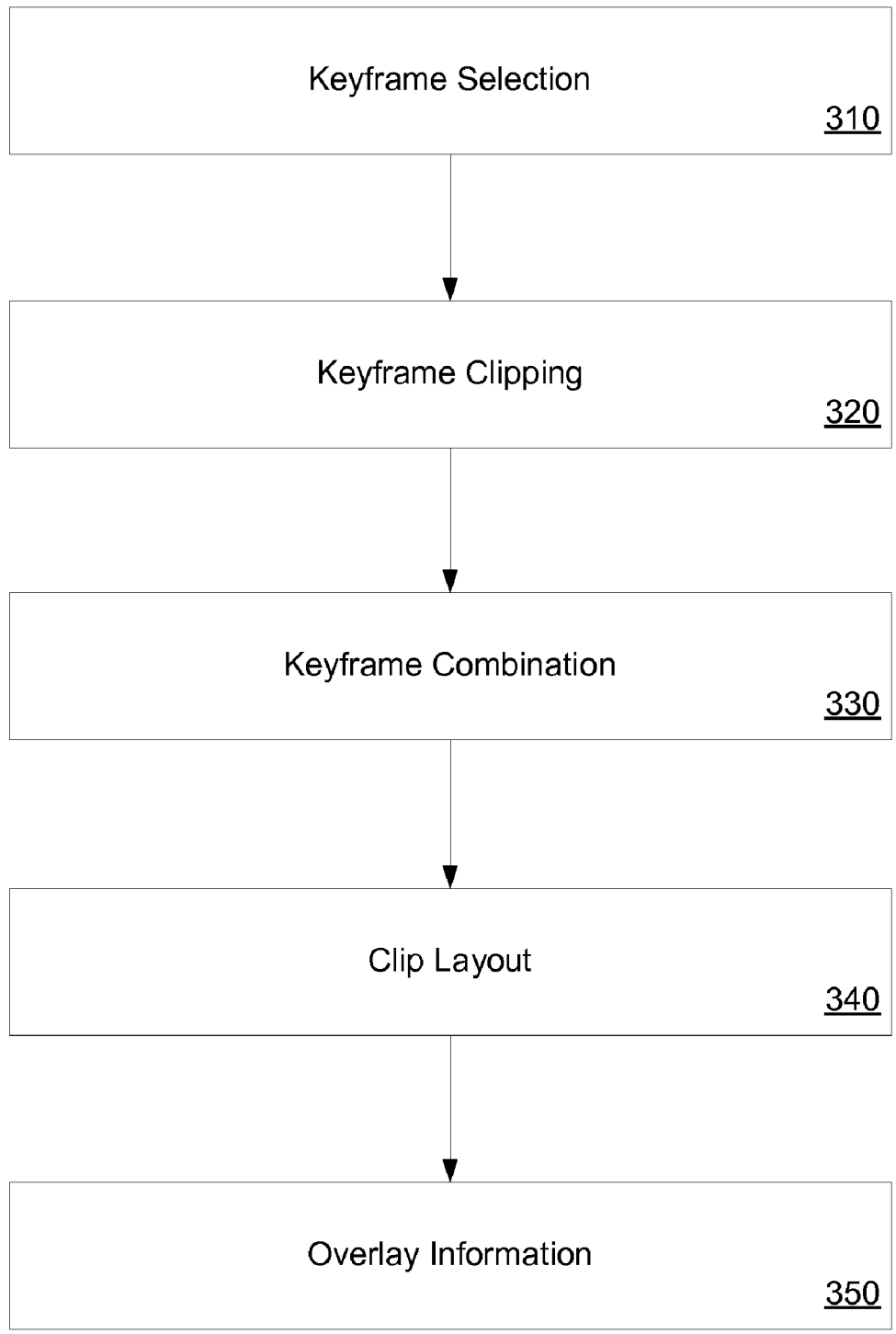
FIG. 3 illustrates a method for creating a reduced representation of a video composite according to an embodiment of the present invention.

FIG. 3 shows a flowchart for generating a reduced representation of a video composite. At step 310, keyframes are selected from the video clips or composites contained in the video composite. Keyframes are selected according to a variety of criteria. In an embodiment, a keyframe is selected from each video clip or composite. In an alternate embodiment, keyframes are selected from the first and last video clips in the sequence. Additional keyframes are selected so as to provide a good overall summary of the sequence. This may be done by selecting keyframes from the longest clip, by selecting keyframes from the most distinctive clips, or by selecting the required number of keyframes at even time intervals from the composite.

Any of numerous methods may be used to select an individual keyframe from a video clip. In an embodiment, the first, last, or center frame may be selected as the keyframe fo the clip. In another embodiment, a keyframe may be selected that is most similar or representative of the other frames of the video clip. Similarity between clips may be determined by comparing the color histograms of the frames or by some other method.

Keyframe clipping is performed at step 320. Keyframe clipping identifies portions of each keyframe which are meaningful. In an embodiment, meaningful portions of each keyframe are preserved, while extraneous portions, such as the background, of the keyframe are discarded. This minimizes the scaling required to reduce keyframes to the required size. Heuristics are used to select meaningful portions of each keyframe in an embodiment. One heuristic is to select the center of the keyframe as the most meaningful portion. In an alternate embodiment, heuristics are used in conjunction with a foreground/background separation technique. The foreground/background separation identifies all the portion of keyframe occupied by foreground objects. Heuristics are used to select a portion of the foreground, taking into account undesirable results, such as cutting out a person's head from the image.

In an embodiment, a pixel sampling technique can be used to separate the foreground from the background pixels. In this embodiment, each pixel in the frames of a video clip is sampled overtime. The pixel values that change only slightly, if at all, may be considered the background pixels. In one embodiment, pixel changes can be classified by determining whether the pixel changes have a standard deviation below or above a certain threshold. Small gaps in areas of foreground pixels can be filled before selecting the foreground objects. In one embodiment, an adjustment for camera motion is made before performing the pixel sampling technique.

At optional step 330, several keyframes are combined into a single keyframe. In an embodiment discussed below, object motion overtime is visualized with this technique. Clip layout step 340 places the keyframes in a graphical arrangement. The separate keyframes are combined at this step into a single graphical object. Example graphical layouts are discussed below. In an embodiment, keyframes may be reduced in size in order to fit into the reduced representation.

Optional step 350 overlays additional information on the reduced representation. Information includes composite time length, number of components, and component depth. In an embodiment, an abstract tree representation is overlaid on the reduced representation to show the number of components and their depth. In an example of an abstract tree representation, nodes, displayed as dots, represent components, and lines connecting nodes show the depth of the components.

Figure 4:
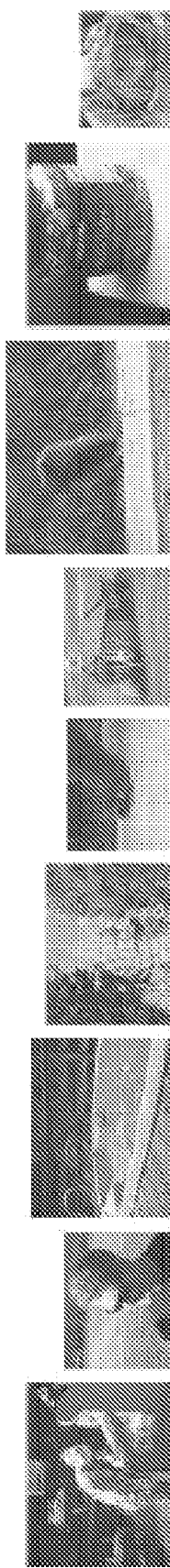
FIG. 4 illustrates a set of sample video clips used to create a reduced representation.
Figure 5:
FIG. 5 illustrates several embodiments of reduced representations for a video composite.
Figure 5:
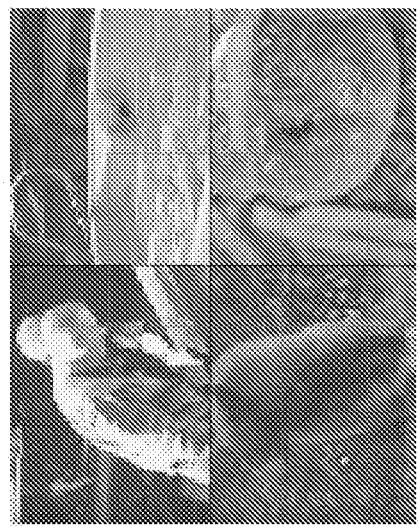
Figure 5:
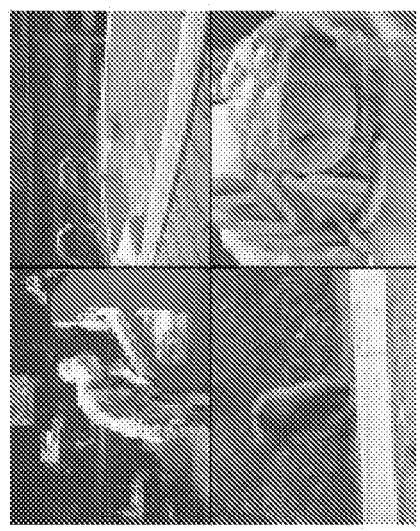

FIG. 4 shows a group of nine video clips which are to be grouped into a video composite. FIG. 5 shows three example reduced representations for a video composite comprised of the video clips of FIG. 4. Reduced representations 520, 540, and 560 arrange keyframes in a four-way representation. A keyframe from the starting clip will be in the top left position, and a keyframe from the ending clip of the sequence occupies the bottom right position. This arrangement is intended to mirror the left-to-right order in presenting text in English, and may be reversed as needed for other languages. The other two positions are occupied by keyframes from intermediate video clips.

In the embodiment of representation 520, each full keyframe is scaled to occupy one quarter of the representation. Embodiment 540 displays only a meaningful portion of each keyframe. Selecting a region of the keyframe of the desired size, here one quarter of the representation area, eliminates the need to reduce the size of the keyframe. Alternatively, a larger region of the keyframe may be selected and scaled down appropriately. Portions of the keyframe may be selected using heuristics or by a foreground/background separation, as discussed above.

Embodiment 560 allocates space to the first and last clips' keyframes in proportion to the importance of each clip. In an embodiment, the importance of a video clip may be determined by the relative length of each clip. Other measures of importance may be used in determining the relative size for each keyframe in the reduced representation, such as measures of action or motion. Embodiments 520, 540, and 560 are intended as illustrative examples; the specific features of embodiments 520, 540, and 560 may be interchanged to produce variations of these embodiments.

Figure 6:
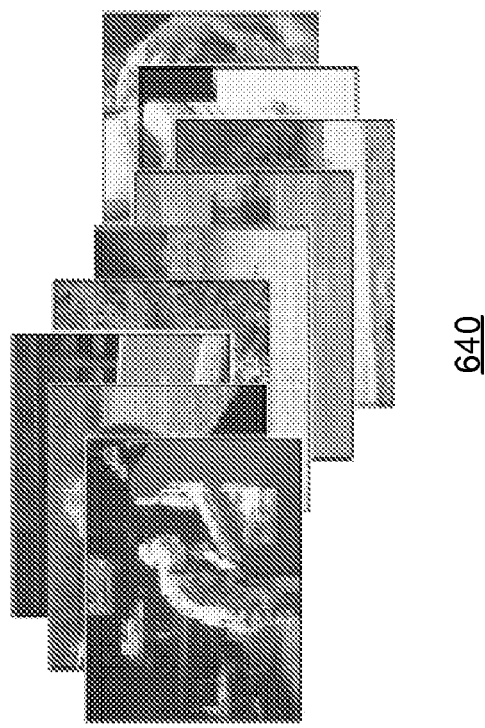
FIG. 6 illustrates several embodiments of reduced representations for a video composite.
Figure 6:
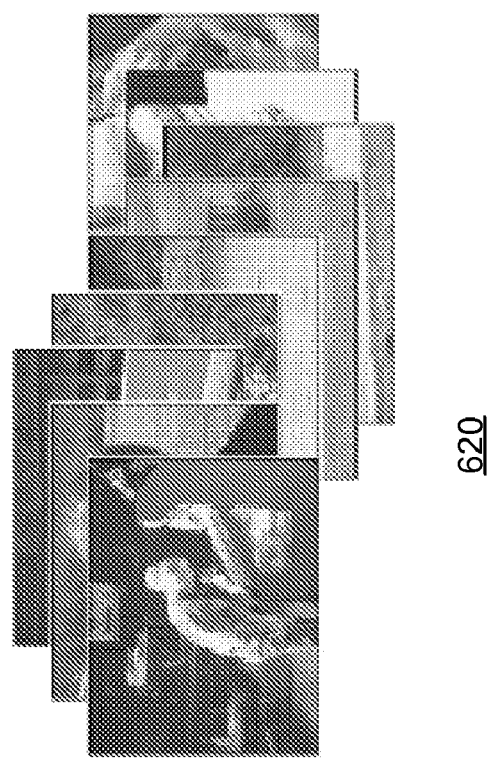

Rather than selecting only four of the component keyframes, FIG. 6 shows two example embodiments of reduced representations that combine all nine keyframes. The nine source frames are overlaid, moving each sequential keyframe up (or down) and to the right of the prior keyframe. In these examples, the overall layout is in an S-shaped arc (first going up, then down beyond the starting position, then back up.) In an embodiment, each keyframe is reduced in size so that the reduced representation occupies the same amount of space as the representation of a single video clip. In an alternate embodiment, each keyframe is reduced in size, but the entire reduced representation is permitted to exceed the size of a representation of a single video clip.

Embodiment 620 uses a constant offset in both the X and Y dimensions. This causes the tops and bottoms of the keyframes to line up when they are next to one another. Embodiment 640 shows using a different offset when moving the next frame up than when moving the next frame down, removing the alignment of neighboring keyframes in the reduced representation. This causes a general downward slope to the s-shaped arc, conveying an additional visual cue of chronological order to users.

Figure 7:
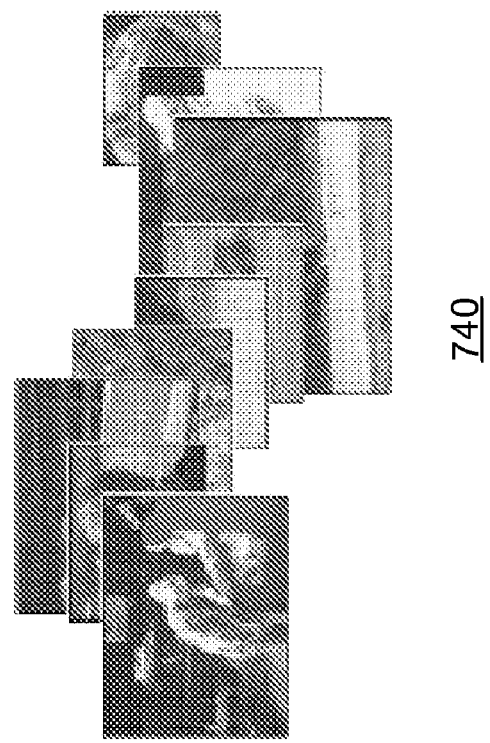
FIG. 7 illustrates several embodiments of reduced representations for a video composite.
Figure 7:
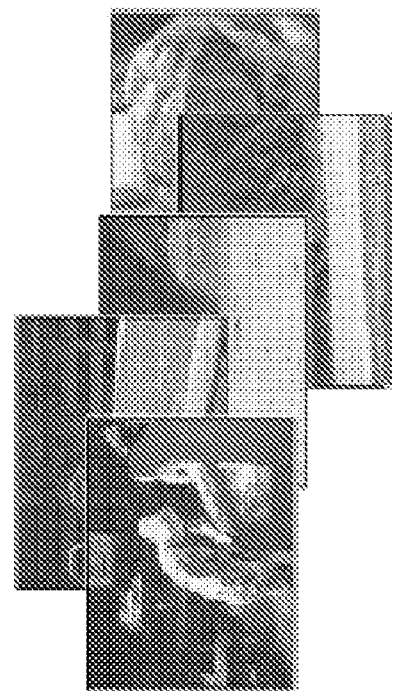

FIG. 7 illustrates a modification to the embodiments of FIG. 6. As an attempt to show more information in each keyframe, the embodiments of FIG. 7 remove every other keyframe the representation. Embodiments 720 and 740 use 5 keyframes each and are still in an S shape. Embodiment 740 allocates space to the each keyframes in proportion to the relative lenght of each clip, similar to the technique used in embodiment 560. Other measures of importance may be used in determining the relative size for each keyframe in the reduced representation, as discussed above. The spacing between keyframes has also been increased in embodiment 740. This results in a less cluttered appearance.

In an alternate embodiment, the keyframes are arranged in an upside-down u-shaped arc. This embodiment, as well as the embodiments of FIGS. 6 and 7, are intended as illustrative examples; the specific features of these embodiments may be interchanged to produce variations of these embodiments.

Figure 8:
FIG. 8 illustrates the result of keyframe combination according to an embodiment of the present invention.

FIG. 8 illustrates the result of keyframe combination as discussed above with regard to step 330 of FIG. 3. In FIG. 8, clips belonging to the same scene are combined to visualize the object motion during the scene. To determine the motion information, several frames from a clip are captured in equal time intervals to produce a sequence of frames. A frame from the center of the sequence is selected as a base frame. The frames before and after the base frame are used to visualize the past and future, respectively.

Each frame is compared to its adjacent frames and areas that changed between two subsequent frames are colored in the still image. The colorized differences are added to the base frame. In an embodiment, different colors are used to visualize time. For example, events in the past are colored red whereas events in the future are blue. The red varies from a shade of orange in the far past to a solid red in the recent past. Similarly, a light blue is used far in the future and a solid blue closer to the present.

In an embodiment, thresholding may be used to emphasize objects in motion. To determine changed areas between frames, the luminance of corresponding pixels is compared. If the luminance changes more than 10%, the pixels are considered to be different.

Lower thresholds make objects in motion stand out better but they also introduce additional noise. In an alternate embodiment, pixel differences that surpass half the threshold are displayed semi-transparently.

In an embodiment, the luminance of the whole frame is normalized before the comparison to avoid effects of overall variations in luminance. The mean and standard deviation of the luminance of all pixels in a frame are determined. For each pixel, the mean is subtracted from the luminance value and the result is divided by the standard deviation. In a further embodiment, the frames are slightly blurred before the comparison addition to filter out very small movements. This blur is only used in the comparison and not for the display of the center frame.

In an embodiment, the colorized parts are partially transparent. The amount of transparency is varied depending on how close a frame is to the center frame, so that changes far in the past or future are more transparent than more recent changes.

In an embodiment, the camera motion needs to be determined and corrected in order to adjust for camera panning. This embodiment highlights object motion and ignores camera motion as if the camera had not moved. One embodiment for correcting camera motion is to determine the offset between two subsequent frames. The center area of one frame is moved in different directions and compared with the center area of the other frame. The center area of a frame is moved by the same amount in eight different directions and compared with the subsequent frame. In an embodiment, the sum of the squared luminance differences is used for comparison.

The comparison values for each of the eight different points and the point without movement are compared to each other. The point with the smallest difference is selected and used as the starting point for the next iteration, in which the area is moved half as far. This logarithmic approach quickly finds the offset between two frames. In an embodiment, it is even sufficient only to compare every fourth pixel in each direction so that the process is sped up by a factor of 16. An alternate embodiment moves nine areas independently of each other and uses the average movement as the overall movement. Once the offset between two frames has been found, the position of the subsequent frame is shifted to eliminate the offset prior to the computation of object motion.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method for creating a hierarchy of video sequences, the method comprising:
   creating source and destination video sequences and presenting the combination of one or more video clips and composites in a chronological order corresponding to their arrangement in a user interface layout area;
   creating a link between the source video sequence and the destination video sequence for transitioning between source and destination video sequences; and
   assigning one or more link attributes to the link, the one or more link attributes including:
      specifying a playback start point of the destination video sequence when entering the destination video sequence from any point in the source video sequence, wherein the playback start point is located at any point in the destination video sequence;
      specifying a playback resumption point when the destination playback is complete or is interrupted by a user, wherein the playback resumption point is located at one of any point in the source video sequence and any point in an alternate video sequence;
      reducing representations of a composite by selecting keyframes from video clips in the composite;
      displaying the keyframes to the user interface layout area in the same amount of space as the representation of a single video clip; and
      clipping of keyframes to reduce keyframes to a smaller size, wherein clipping comprises one or more of:
         selecting the center area of the keyframe as the portion to retain; and
         selecting objects in the foreground as the portion to retain using heuristics or a pixel sampling technique.

2. A method for creating a hierarchy of video sequences, the method comprising:
   creating source and destination video sequences;
   creating a link between the source video sequence and the destination video sequence for transitioning between source and destination video sequences;
   assigning one or more link attributes to the link, the one or more link attributes including:
      specifying a playback start point of the destination video sequence when entering the destination video sequence from any point in the source video sequence, wherein the playback start point is located at any point in the destination video sequence; and
      specifying a playback resumption point when the destination playback is complete or is interrupted by a user, wherein the playback resumption point is located at one of any point in the source video sequence and any point in an alternate video sequence; and
   wherein one or more of the playback start point and the playback resumption point are each automatically set to a default point.

3. A method for creating a hierarchy of video sequences, the method comprising:
   creating source and destination video sequences;
   creating a link between the source video sequence and the destination video sequence for transitioning between source and destination video sequences;
   assigning one or more link attributes to the link, the one or more link attributes including:
      specifying a playback start point of the destination video sequence when entering the destination video sequence from any point in the source video sequence, wherein the playback start point is located at any point in the destination video sequence;
      specifying a first playback resumption point when the destination playback is complete, wherein the first playback resumption point is located at one of any point in the source video sequence and any point in an alternate video sequence; and
      specifying a second playback resumption point when the destination playback is interrupted by a user, wherein the second playback resumption point is located at one of any point in the source video sequence and any point in an alternate video sequence; and
   wherein one or more of the playback start point, the first playback resumption point, and the second playback resumption point are each automatically set to a default point.

* * * * *